(12) United States Patent
Shor et al.

(10) Patent No.: US 9,730,215 B2
(45) Date of Patent: Aug. 8, 2017

(54) METHOD AND DEVICE FOR INTERFACING IN A MOBILE COMMUNICATION SYSTEM

(71) Applicants: Roy Shor, Tel-Aviv (IL); Ori Goren, Kibutz Ruchama (IL); Avraham Horn, Givat Shmuel (IL)

(72) Inventors: Roy Shor, Tel-Aviv (IL); Ori Goren, Kibutz Ruchama (IL); Avraham Horn, Givat Shmuel (IL)

(73) Assignee: NXP USA, Inc., Austin, TX (US)

( * ) Notice: Subject to any disclaimer, the term of this patent is extended or adjusted under 35 U.S.C. 154(b) by 73 days.

(21) Appl. No.: 14/889,485

(22) PCT Filed: May 29, 2013

(86) PCT No.: PCT/IB2013/054441
§ 371 (c)(1),
(2) Date: Nov. 6, 2015

(87) PCT Pub. No.: WO2014/191796
PCT Pub. Date: Dec. 4, 2014

(65) Prior Publication Data
US 2016/0128040 A1 May 5, 2016

(51) Int. Cl.
*H04W 72/04* (2009.01)
*H04W 88/18* (2009.01)
(Continued)

(52) U.S. Cl.
CPC ....... *H04W 72/044* (2013.01); *H04L 27/2338* (2013.01); *H04W 88/181* (2013.01); *H04W 88/085* (2013.01); *H04W 92/00* (2013.01)

(58) Field of Classification Search
None
See application file for complete search history.

(56) References Cited

U.S. PATENT DOCUMENTS

| 8,433,251 B2 | 4/2013 | Chen et al. | |
|---|---|---|---|
| 2005/0105552 A1* | 5/2005 | Osterling | H04L 69/18 370/466 |

(Continued)

FOREIGN PATENT DOCUMENTS

KR 1020120065054 6/2012

OTHER PUBLICATIONS

International Search Report and Written Opinion correlating to PCT/IB2013/054441 issued on Feb. 17, 2014.

(Continued)

*Primary Examiner* — Bunjob Jaroenchonwanit (57) ABSTRACT

Interfacing according to a common public radio interface in a base station in a mobile communication system is described. The interfacing comprises a conversion process for rate-converting legacy data samples. First a predetermined number of the legacy data samples is converted to frequency samples in a frequency domain, then the frequency samples are zero padded to extend the frequency range according to a related sample rate of a 4G data format and then converted into a number of data samples of the related sample rate. The related sample rate is a multiplication of S/K times a basic frame rate of the 4G data format, S samples being allocated to K frames, K and S being integers and K being 8 or less. Advantageously large buffers for allocating a large number of legacy samples to 4G frames are avoided.

16 Claims, 7 Drawing Sheets

(51) Int. Cl.
*H04L 27/233* (2006.01)
*H04W 92/00* (2009.01)
*H04W 88/08* (2009.01)

(56) References Cited

U.S. PATENT DOCUMENTS

| | | | |
|---|---|---|---|
| 2010/0067426 A1* | 3/2010 | Voschina | H04W 88/08 370/313 |
| 2011/0032910 A1* | 2/2011 | Aarflot | H04J 3/0682 370/335 |
| 2011/0070845 A1 | 3/2011 | Chen et al. | |
| 2011/0085513 A1 | 4/2011 | Chen et al. | |
| 2011/0207451 A1* | 8/2011 | Brauer | H04L 5/0007 455/422.1 |
| 2014/0079037 A1* | 3/2014 | Evans | H04W 88/085 370/336 |
| 2016/0249370 A1* | 8/2016 | Lu | H04W 24/02 |

OTHER PUBLICATIONS

CPRI Specification V4.2 (Sep. 29, 2010), Common Public Radio Interface (CPRI); Interface Specification.
CPRI Specification V5.0 (Sep. 21, 2011), Common Public Radio Interface (CPRI); Interface Specification.
Fact sheet B4860 "QorIQ Qonverge B4860 Baseband Processor" by Freescale.
"Next-Generation Wireless Network Bandwidth and Capacity Enabled by Heterogeneous and Distributed Networks" White Paper by Freescale.

\* cited by examiner

METHOD AND DEVICE FOR INTERFACING IN A MOBILE COMMUNICATION SYSTEM

FIELD OF THE INVENTION

This invention relates to a device and method for a mobile communication system. An example of a mobile communication system is a fourth generation (4G) cell based mobile communication system such as LTE system (Long Term Evolution, which is the most recent step forward from cellular 3G services) or the Wideband Code Division Multiple Access (W-CDMA) system.

An overview of such systems can be found in the white paper "Next-Generation Wireless Network Bandwidth and Capacity Enabled by Heterogeneous and Distributed Networks" by Freescale, which company also provides processors for such systems such as B4860 "QorIQ Qonverge B4860 Baseband Processor". This processor targets macro cell base station designs for broadband wireless infrastructure and has four 64 bit, dual-threaded processor cores, six 16 bit 32GMAC/cycle calculation cores and baseband acceleration processing engines. It is designed to adapt to the rapidly changing and expanding standards of LTE (FDD and TDD), LTE-Advanced and WCDMA and supports different standards simultaneously. Technical data for the B4860 processor is available via http://www.freescale.com/webapp/sps/site/prod_summary.jsp?code=B4860

BACKGROUND OF THE INVENTION

In cell based mobile communication systems base stations are provided to communicate with the mobile devices. Such base stations usually have a high frequency radio part, called Radio Equipment (RE), which RE is controlled by a further part called Radio Equipment Controller (REC). The REC may be located in the base-station cabinet, while the RE is usually located near the antennas. An interface between both parts has been standardized, and is called Common Public Radio Interface (CPRI).

The standard "Common Public Radio Interface (CPRI); Interface Specification V5.0 (2011, Sep. 21)", as provided on http://www.cpri.info, describes the interface, abbreviated CPRI V5. An older version of the CPRI is "Common Public Radio Interface (CPRI); Interface Specification V4.2 (2010, Sep. 29)", also provided on http://www.cpri.info, abbreviated CPRI V4, defines an earlier version of the interface. In general, sub-versions of the CPRI V4 or V5 are denoted as V4.x or V5.x.

The Common Public Radio Interface (CPRI) configuration consists of multiple Radio Equipment Controllers (REC) and multiple Radio Equipments (RE) connecting point to point in a chain network using very high frequencies (up to 9.8 GHz). Data samples are received at the RE and interfaced via an IQ data link to the REC, in a data format based on the I and Q components of the modulated signal. Besides IQ data link, CPRI supports further types of communication and management (C&M) data: a Vendor Specific ("VSS") channel, a HDLC ("slow C&M channel") and an Ethernet link ("fast C&M channel").

Figure 1:
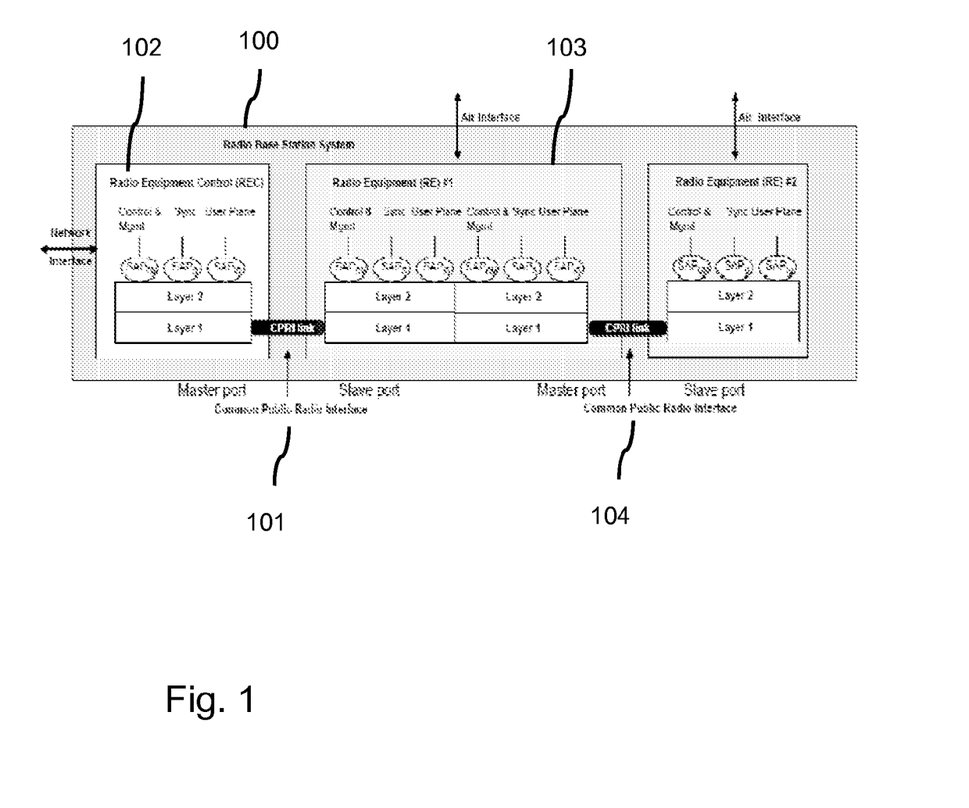
FIG. 1 shows an example of CPRI connectivity.

FIG. 1 shows an example of CPRI connectivity. The Figure shows an example of a base station architecture 100 comprising a CPRI interface 101 between a REC 102 and an RE 103. A further CPRI interface 104 may be provided to interconnect multiple REs. As such, the CPRI interface is described in the CPRI V5 and chapter 2 describes the CPRI related parts of the basic radio base station system architecture. The Figure is taken from chapter 2 (see CPRI V5, FIGS. 2 and 2A on page 10) and is further described in chapter 2.2 System Architecture of the CPRI standard.

It is noted that existing CPRI controllers in baseband processing (Layer 1 processing) chips may support CPRI V4.x or former versions. CPRI V4.x supports the following telecommunication standards: WCDMA, LTE and WiMAX, but it does NOT support the legacy GSM communication standard (Global System for Mobile Communications), which is the well known standard set developed by the European Telecommunications Standards Institute (ETSI) to describe protocols for second generation (2G) digital cellular networks used by mobile phones, i.e. the de facto global standard for mobile communications. CPRI V5.x is a newer standard (from late 2011) which enhanced the CPRI to support GSM as well. However, there are many existing systems that have GSM infrastructure installed. In such systems, which use the current processors with CPRI 4.x support only, GSM support is lacking.

SUMMARY OF THE INVENTION

The present invention provides an interface method and apparatus, a computer program product and a semiconductor device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

It is noted that there are several ways to solve the issue of GSM support over CPRI. In general, it is assumed that providing GSM support at least requires updating the antenna side, as the GSM signal must be transmitted here, and therefore must be supported for interfacing on the CPRI interface at the RE units. Hence it is assumed that the GSM issue for CPRI 4.x is to be resolved in the radio controller in the base-station. So there is no issue at the antenna side; usually the antenna side is implemented by the final systems installer, and devices are built or upgraded, for example, using FPGA technology. Hence in the further elucidation it is assumed that the RE side has been upgraded to support CPRI V5.x. Nevertheless the invention is similarly applicable at the RE side having CPRI V4.x for interfacing with an REC that has CPRI V5.x, or between two units both having CPRI V4.x, or for interfacing in a chain configuration between consecutive REC units.

Figure 2:
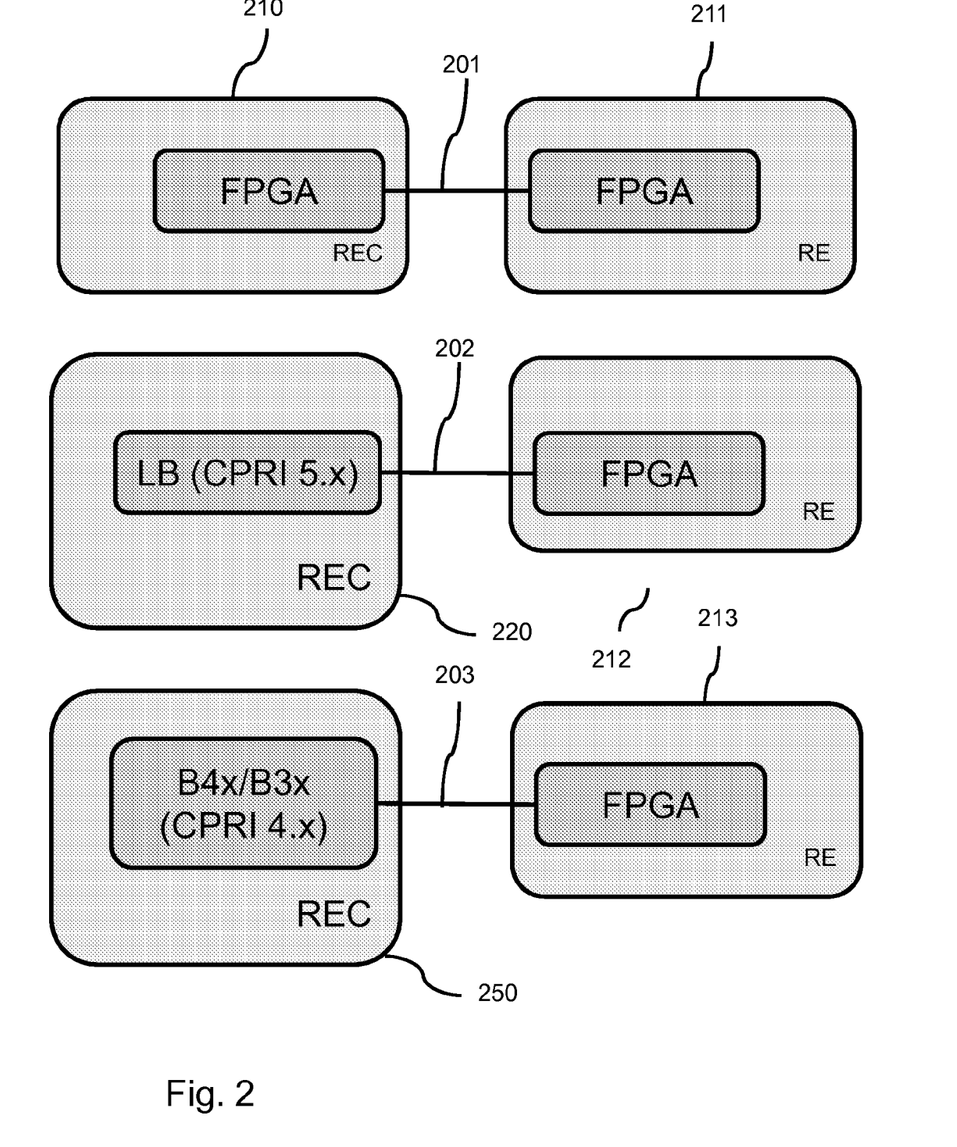
FIG. 2 shows examples of facilitating GSM over CPRI.

FIG. 2 shows examples of facilitating GSM over CPRI. In a first (upper) example a base station RE 210 is communicating GSM signals across a CPRI V5.x interface 201, to a REC 211. Both the RE and the REC have been upgraded or built fully using FPGA components supporting the CPRI V5 standard, so GSM traffic is handled on the CPRI interface 201 according to CPRI V5. This configuration requires a programmable hardware upgrade of the REC, which is expensive, as the REC has to be reconfigured.

In a second (mid) example a base station RE 220 is communicating GSM signals across a CPRI V5.x interface 202, to a REC 212. The RE has been upgraded or built fully using FPGA components supporting the CPRI V5 standard, so GSM traffic is to be handled on the CPRI interface 202 according to CPRI V5. The REC now has a data handler device marked LB (CPRI 5.x), which is fully upgraded to CPRI V5 using new hardware. Such a full HW solution may be relevant for new installations, but does not provide a viable solution for re-using existing CPRI V4 equipment. So his configuration requires a full hardware upgrade of the REC, which is expensive, as the REC has to be replaced or rebuilt.

In the third (lower) example a base station RE 250 is communicating GSM signals across a CPRI V5.x interface 203, to a REC 213. The RE has been upgraded or built fully using FPGA components supporting the CPRI V5 standard, so GSM traffic is to be handled on the CPRI interface 203 according to CPRI V5. The REC now has a data handler device marked B4x/B3x (CPRI 4.x). B4x is a family of devices (among them B4860) that are currently available. B3x is a future family of devices, currently in definition phase. The lower system indicates a data handler based on CPRI 4.x but having an additional dedicated function to support legacy GSM traffic according to CPRI V5 while further using existing hardware. Such a dedicated function may be implemented substantially in software, which SW solution may be implemented on existing installations, or in a (limited) extension of hardware. So this configuration does not require a full hardware upgrade of the REC, which is advantageous, as the REC need not be replaced or rebuilt.

So, in the further embodiments, it is proposed not to upgrade the REC to the new CPRI V5 standard, but instead to remain, at the REC side, at the CPRI V4 standard, while GSM support is added by providing an additional function to the data interface at the REC side to transport the GSM data samples as elucidated below.

Figure 3:
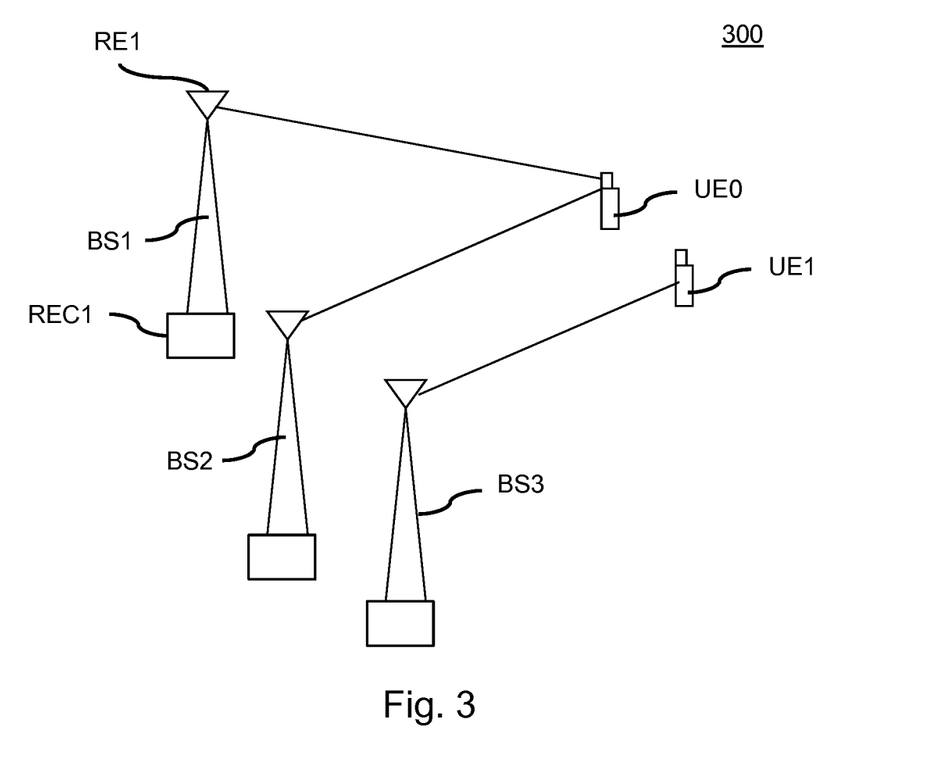
FIG. 3 schematically shows an overview of a mobile communication system.

FIG. 3 shows an example of an overview of a mobile communication system. In the example, the mobile communication system 300 has three base stations BS1, BS2, BS3 and two mobile devices, called user equipment UE0, UE1. The first user equipment UE0 is shown to communicate with two base stations BS1 and BS2, e.g. in a communication handover process, and the other user equipment UE1 is shown to communication with BS3. In the base station BS1 radio unit RE1, is coupled to an antenna for radio transmitting and receiving. The radio unit RE1 is coupled to a radio controller unit REC1 for providing transmission data and control information to the radio unit RE1.

The radio unit RE1 and radio controller unit REC 1 in the base station BS1 in the mobile communication system 300 are connected via an interface. Thereto, the radio controller unit has a common public radio interface according to a first version of a common public radio interface standard, for example CPRI V4, and the radio unit RE1 has a common public radio interface according to a second version of a common public radio interface standard, for example CPRI V5. Both said first and second version support a 4G data format for transferring data samples for communicating via a fourth generation system for mobile communication. The second version further provides a data format for transferring legacy data samples (IQ) for communicating via a legacy system for mobile communication (GSM) of a generation before the fourth generation, which data format is not provided by the first version.

In the base station the interfacing is provided with a conversion process for rate-converting the legacy data samples having a legacy sample rate as predefined in the legacy system, for example GSM. Thereto, the process involves the following functions, which are further elucidated below with FIGS. 4 and 5. A first function converts a predetermined number of the legacy data samples to be transmitted to frequency samples in a frequency domain. A subsequent function extends the frequency sample by zero padding the frequency samples to extend the frequency range according to a related sample rate of the 4G data format. Finally the frequency samples are converted into a number of data samples of the related sample rate. In the process, the related sample rate is a multiplication of S/K times a basic frame rate of the 4G data format, while S samples are allocated to K frames. K and S are integers and are 8 or less. In a practical example the conversion process is constructed as follows.

In a CPRI V4.x system data in GSM sampling rates (i.e. 325K Hz or 1625/6=270.833 KHz) is transferred. In the CPRI standard basic frames are transmitted at a speed called frame rate corresponding to a chip rate of the transmission system, e.g. in WCDMA the sampling rate of 3.84 Mbps. In order to achieve to transfer data at different sampling rates in the CPRI standard, S samples are entered each K basic frames, S and K being integers. Suitable sampling rates are multiplications of chip rate, such as i*3.84 Mbps (i.e. 1.92, 3.84, 7.68, . . . , 30.72 Mbps). Said rates enable easy support for LTE/A-LTE protocol, because there are 1 or 2 or 4 or 8 LTE IQ samples in every basic frame. To support 1.92 Mbps, there is one sample every 2 basic frames.

In order to achieve other rates (4, 5.6, 8, 10, 11.2 MHz, etc. for WiMAX, or 0.325, 0.27 MHz for GSM), different value for the integers K and S are used, where $$\text{Required\_Rate}=(S/K)*3.84.$$

According to the above relation, for example for 4 Mbps, there are 25 IQ samples in each 24 basic frames (4=25/24*3.84). Note that the allocation is predetermined, i.e. there are exactly S IQ samples each K basic frames allocated (further unused samples are padded). By appropriate values for S and K each sample can be flexibly allocated to any basic frame. However, calculation shows that in order to achieve GSM sampling rates (0.27/0.325 MHz), a large value of K of 4,608 is required. It is noted that allocating to a large number (K) frames requires large buffers. Handling large K (e.g. 4,608) in allocation can be done in two methods. In a first method configuration tables are used for mapping. These mapping tables describe how the mapping is done along K basic frames, i.e. which sample is to be mapped to which basic frame. However, table size would be around 1 MB for each CPRI link, which might be somewhat reduced by tables encoding/decoding. Such large tables are disadvantageous, for example because of the require area and power considerations. A second, alternative method requires pre and post re-sampling. In fact, re-sampling to a data rate which is closer to an LTE rate may be applied in order to reduce K to 768 by re-sampling with a factor of 6

(e.g. 1.625 Mbps instead of 0.27 Mbps), which would reduce the size of the tables. However, the tables are still rather large, e.g. around 160 KB is needed per link.

On the contrary to using large tables or the above factorized re-sampling, in the proposed system re-sampling is performed to a data rate that is directly related to the supported data rates that are used in the 4G communication system (e.g. the LTE rate of 3.84 Mbps, as quoted above), i.e. multiplications of the basic frame rate. Moreover, to substantially avoid any complex allocation, K may be minimized to 4 or less.

In a practical example GSM samples are re-sampled to a rate related to the LTE rate. The idea is to utilize DFT/iDFT (Digital Fourier Transform or inverse DFT) capabilities of a processor available in the CPRI V4 system, e.g. a MAPLE engine and the DSP Core as provided in the B4860 device as mentioned in the introduction, to perform data re-sampling in a manner that will fit the GSM sampling rates to a related LTE sampling rate. A "MAPLE engine" is a co-processor that performs signal processing functions like DFT. A further processor is called eFTPE, which is an enhanced Fourier Transform Processing Element, which is a HW accelerator which is part of the MAPLE. MAPLE is composed of several processing elements, e.g. DFT, FFT, MMSE, and more. MAPLE is present in present baseband chips of Freescale (e.g. B4860). The MAPLE allows offloading a general purpose processing core from algorithms like FFT, DFT. Such re-sampling to a related rate enables supporting GSM data rates over CPRI v4.x link, although the CPRI v4.x protocol does not support it.

The proposed re-sampling also eliminates the need to implement cumbersome changes in the CPRI MAC to support large K & S factors, which would otherwise be required to adjust the sampling rates and allocate samples.

Figure 4:
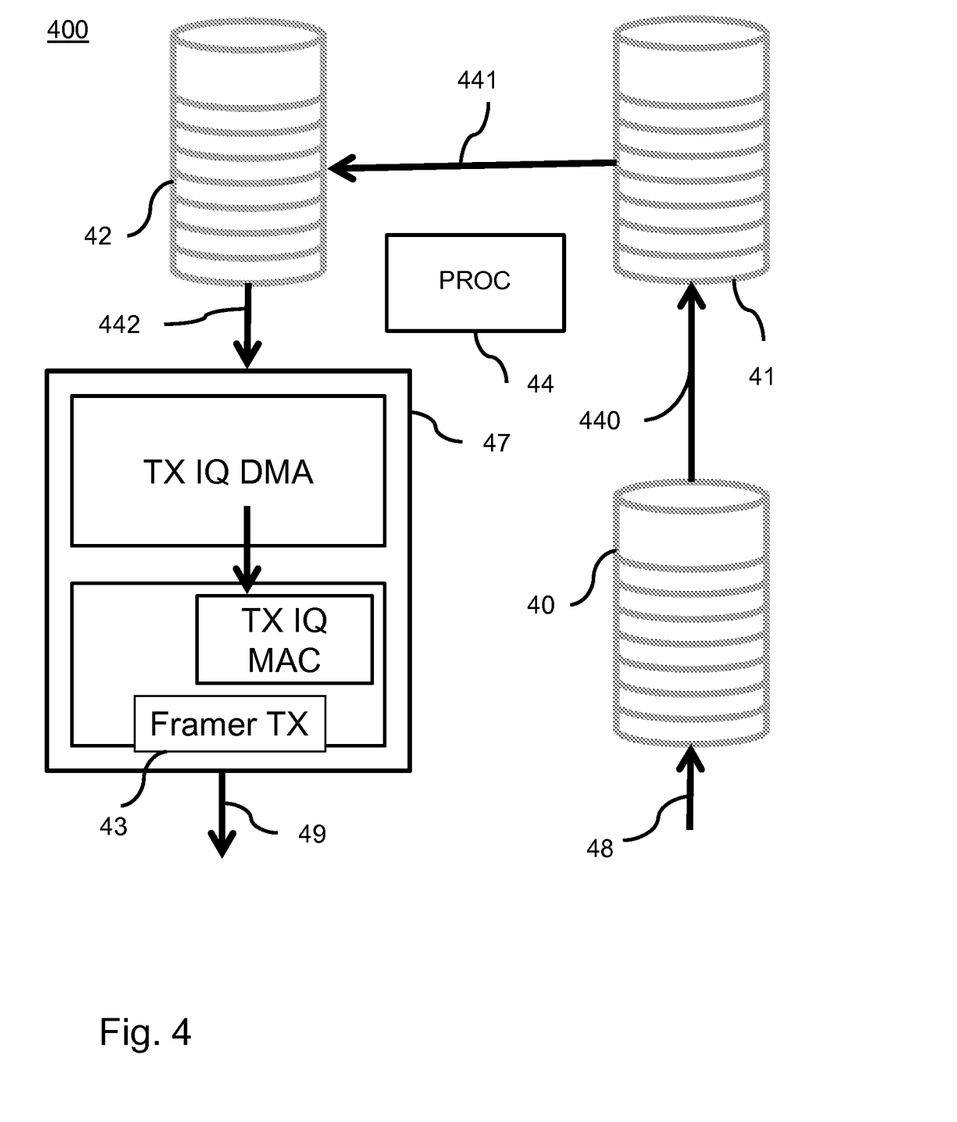
FIG. 4 shows an example of a conversion process in a downlink flow.

FIG. 4 shows an example of a processing device and a conversion process in a downlink flow. The processing device 400 has an interface unit 47 and multiple buffers 40,41,42, which may be dedicated sections of a local memory, and a data processor 44 for performing the data processing 440,441,442 as described below. The data processor may be a core processor and/or dedicated calculation engine like MAPLE, known as such, e.g. from the processor device B4860 described in the introduction. In the interface the Downlink (=DL), refers to data sent to the RE from the REC, whereas Uplink (=UL) refers to data sent from the RE to the REC. Legacy GSM data 48 to be transmitted is first put in a transmitter buffer 40 in GSM rate. The GSM samples are called TX IQ samples in GSM rate, whereas the transmitter buffer may be located at a suitable memory, for example a level cache L2. In a subsequent process Transform_Time_to_Freq 440 the samples in the transmitter buffer 40 are transformed from the time domain to the frequency domain, e.g. by DFT (Digital Fourier Transform) by using a DSP provided in a processor device. In a further example the DFT capabilities of a dedicated processor, e.g. a MAPLE/eFTPE engine as provided in the B4860 device as mentioned in the introduction, can be used to accelerate the process and off load the DSP. The transformed samples are put in a second buffer 41. In a subsequent process Zero_Pad_Convert_to_Time 441, the samples from the second buffer are padded by zeros to the length required by the related data rate, and are taken from the second buffer and transformed back into the time domain using iDFT (inverse Digital Fourier Transform) and stored in a third buffer 42 for the TX_IQ sample, for example at the related LTE rate, e.g. 960 kHz or 1920 kHz. iDFT can be performed by the DSP, or further accelerated by MAPLE/eFTPE (off loading the DSP as well). In a subsequent process Transmit_from_Buf 442, the data is transmitted to a Framer 43 in the related "LTE" rate. In the example: 960 KHz; which is equal to the LTE rate, but a multiplication of the 3.84 MHz required rate. In the example practical values S=1 and K=4 have been applied for allocating the samples. For 1920 kHz the values are S=1 and K=2. The interface unit 47 is provided with a transmitter direct memory access unit TX_IQ_DMA for providing data to be transmitted TX_IQ_MAC. The Framer allocates the samples to the 4G data frames 49 which are provided to the CPRI interface, also called CPRI Lane TX.

In the example, the number of samples used for both transformations are determined upon two pre-configurations, while the "LTE" related rate in this case is 960 KHz and the GSM rate can be either 325 KHz or 270 KHz according to the GSM standard.

In a first configuration, 65 GSM samples at 325 KHz (S=65, K=768) are converted by DFT to frequency samples. Then, the transformed samples are zero padded and converted by iDFT to 192 samples at 960 KHz (S=1, K=4).

In a second configuration, 325 GSM samples at 270 KHz (S=325, K=4608) are converted to frequency samples. Then, the transformed samples are zero padded and converted by iDFT to 1152 samples at 960 KHz (S=1, K=4).

It is noted that an additional delay of 325 (or 65) GSM samples is introduced, which can be compensated by CPRI spec delay management. The CPRI standard defines that the total delay is not relevant, only the delay must be accurately known. So, the enhanced CPRI controller should report on the delay in high accuracy, as defined in section 4.2.9 in the standard, and specifically 4.2.9.3. As the additional delay caused by the proposed re-sampling is fixed and known a-priori it may be compensated via the reporting mechanism. The mechanism in the CPRI controller enables the user to compensate for a given delay that is known and reported. The proposed system for re-sampling has an additional delay that is fixed and known.

Figure 5:
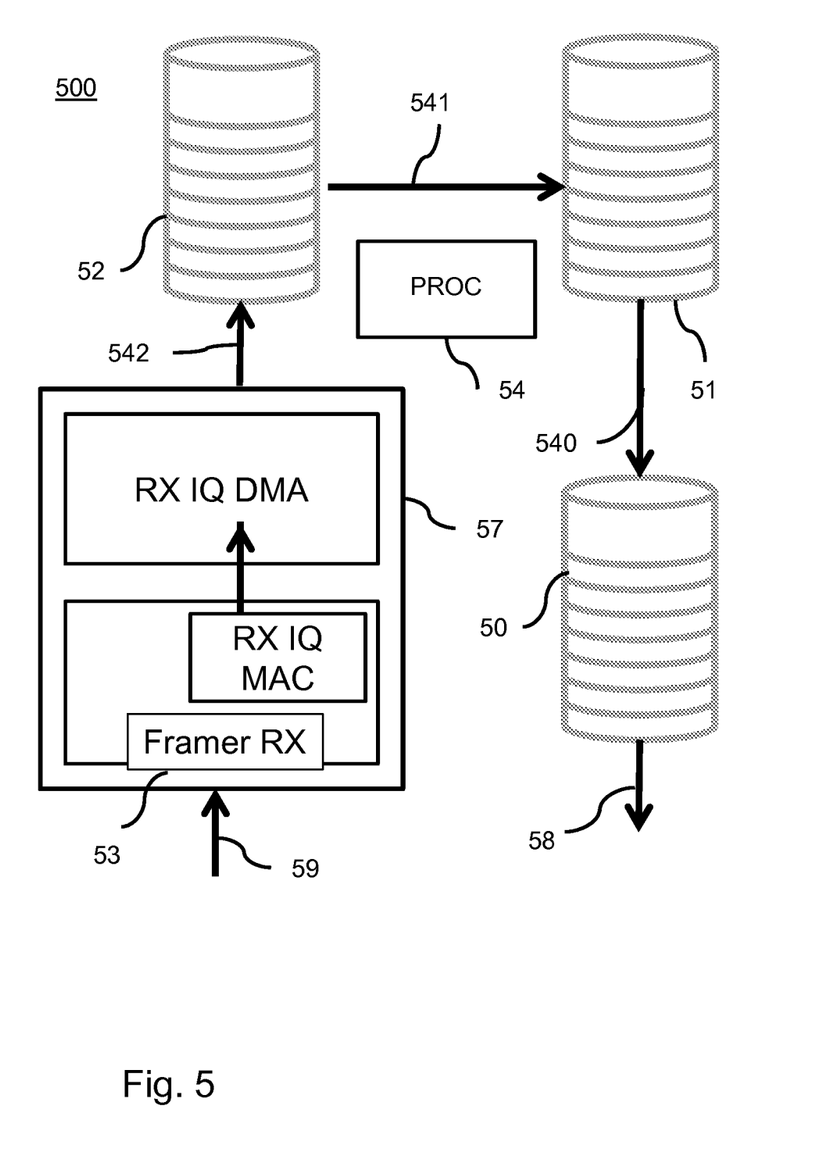
FIG. 5 shows an example of a conversion process in an uplink flow.

FIG. 5 shows an example of a conversion process in an uplink flow. The processing device 500 has an interface unit 57 and multiple buffers 50,51,52, which may be dedicated sections of a local memory, and a data processor 54 for performing the data processing 540,541,542 as described below. The processing device for the uplink flow may be combined with the device for the downlink flow as described above. The data processor may be a core processor and/or dedicated calculation engine like MAPLE, known as such, e.g. from the processor device B4860 described in the introduction. The data frames 59 are received from the interface according to CPRI, also called CPRI Lane RX, in a FRAMER 53 in rate related to the LTE rate, i.e. a multiplication of 3.84 MHz. In the example 960 KHz is used, which is not equal to the LTE rate, but a multiplication of the required rate by S/K is 1/4. In the example the values S=1 and K=4 have been applied for retrieving the samples as allocated to the frames. The interface unit 57 is provided with a receiver direct memory access unit RX_IQ_DMA for forwarding data as received RX_IQ_MAC. The Framer retrieves the samples from the 4G data frames 59.

In a receive process 542 the samples as received at the related rate are put in receive buffer 52, i.e. the TX_IQ samples in related rate are stored in the first receive buffer. In a next process DFT 541 the samples are transformed from the time domain to the frequency domain by DFT. DFT capabilities of a MAPLE/eFTPE engine may be used to accelerate the process and off load the DSP. The transformed samples are put in a second receive buffer 51, i.e. TX_IQ transformed frequency samples in the related rate in the second receive buffer. By a process SEL_and_TRANSFORM 540, according to the DFT characteristics in the frequency domain, only a first number samples from each set are taken from the second buffer 51 and transformed back into the time domain using iDFT. For example, the iDFT may be done by the DSP, and in a further embodiment may be accelerated by MAPLE/eFTPE (off loading the DSP as well). Finally the samples in the time domain, which are now in the GSM rate, are stored in a third buffer 50, i.e. RX_IQ samples are stored in GSM rate in the third buffer. The buffers are located in a local memory, for example on L2

In the example, the number of samples used for both transformations are determined upon two pre-configurations: the "LTE" used is in this case: 960 KHz and the GSM rate can be either 325 KHz or 270 KHz according to the GSM standard.

In a first configuration, the first 65 out of 192 transfers from 960 KHz (S=1, K=4) are converted to 325 KHz (S=65, K=768). In this case, the iDFT is performed on first 65 out of each 192 transformed samples.

In a second configuration the first 325 out of 1152 transfers from 960 KHz (S=1, K=4) are converted to 270 KHz (S=325, K=4608). In this case, the iDFT is performed on first 325 out of each 1152 transformed samples.

It is noted that an additional delay of 325 (or 65) GSM samples is introduced, which can be compensated by CPRI spec delay management.

For implementing the above process in a first embodiment, an available processor hardware structure may already support the described scheme. New software is provided as uCode in the L1 processing engine (e.g. MAPLE) and software for the DFT/iDFT and control is provided for the DSP.

In a further embodiment, the DFT/iDFT of the selected number of samples may be done by a dedicated processor like a MAPLE/eFTPE processor. Such dedicated processor may be provided in hardware, while for such processor new software for the DFT/iDFT may be provided as uCode and further software for the control is provided for the DSP.

The additional conversion function may be implemented using HW accelerators to do the DFT/iDFT calculations, which may further provide an automatic data flow. Optionally a different related rate can be chosen (e.g. other multiplication of the LTE 3.84 MHz rate), which selection enables flexibility in mapping of GSM samples over the CPRI link. Further improvements may include handling of several GSM links over CPRI streams in parallel by the processors, e.g. the MAPLE/DSP engines.

It is noted that the conversion process can be extended and generalized for any "user-specific" protocol with arbitrary sampling rate. While the above describes how to fit "GSM sampling rate" into "LTE" frames on the CPRI interface, it provides a generic solution for re-sampling any data sample rate to fit into a required frame rate on an interface.

The conversion process may further provide number-converting. Samples to be transmitted may have first modulation components (I,Q) represented by a predetermined number of bits according to the first version of the common public radio interface standard. To comply with data processing requirements of an interface according to the second version at the radio unit, the first modulation components are converted to second modulation components having an exponent, mantissa representation according to the second version. Furthermore, the conversion process may include number-converting data samples that are received from the radio unit and have second modulation components having the exponent, mantissa representation according to the second version of the common public radio interface standard. Upon receiving, the second modulation components are converted to first modulation components (I,Q) represented by a predetermined number of bits according to the first version.

In a practical example using CPRI V4 as the first version and CPRI V5 as the second version, the respective IQ sample width has not changed, but the representation is different.

Figure 6:
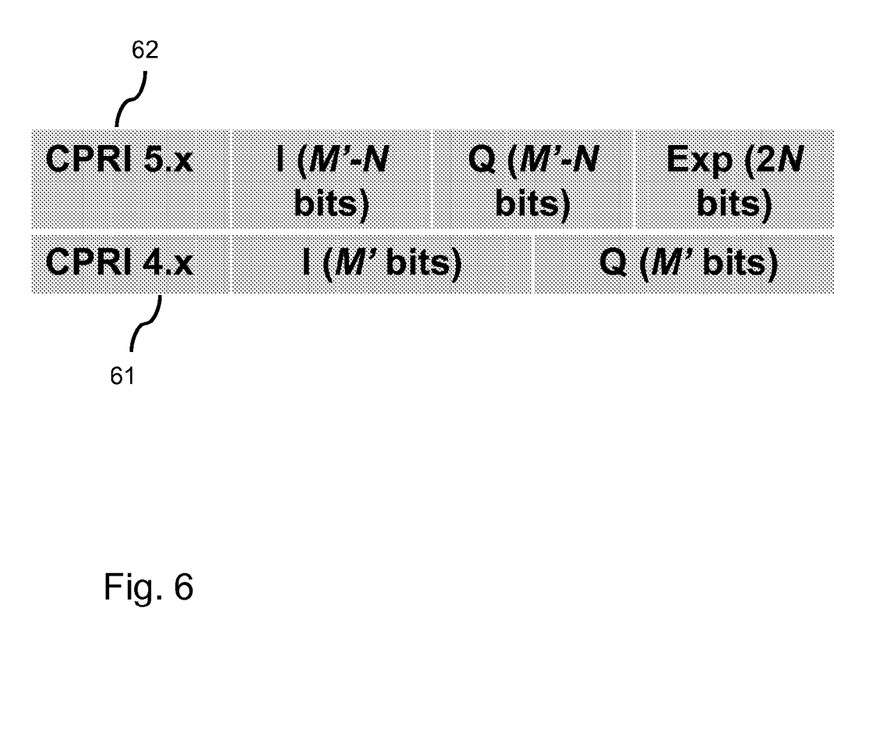
FIG. 6 shows an example of representation of IQ samples.

FIG. 6 shows an example of representation of IQ samples. In the Figure, a second row of a table shows a first representation 61 of IQ samples represented by a predetermined number of bits according to the first version of the common public radio interface standard, e.g. CPRI V4.x. A first row of a table shows a second representation 62 of IQ samples having an exponent, mantissa representation according to the second version of the common public radio interface standard, e.g. CPRI V5.x.

To comply with data processing requirements of the radio unit having an interface according to the second version, in a radio controller device the first modulation components 61 according to the first version of the common public radio interface standard are converted to second modulation components having an exponent, mantissa representation according to the second version. Furthermore, in the radio controller the conversion process may include number-converting received data samples having second modulation components having the exponent, mantissa representation according to the second version of the common public radio interface standard. Upon receiving, the second modulation components are converted to first modulation components (I,Q) represented by a predetermined number of bits according to the first version.

It is noted that by applying the number conversion in the radio controller basically arranged for the first version (e.g. CPRI V4.x) there is no need to adapt the radio unit which has the interface according to the second version (e.g. CPRI V5.x).

Figure 7:
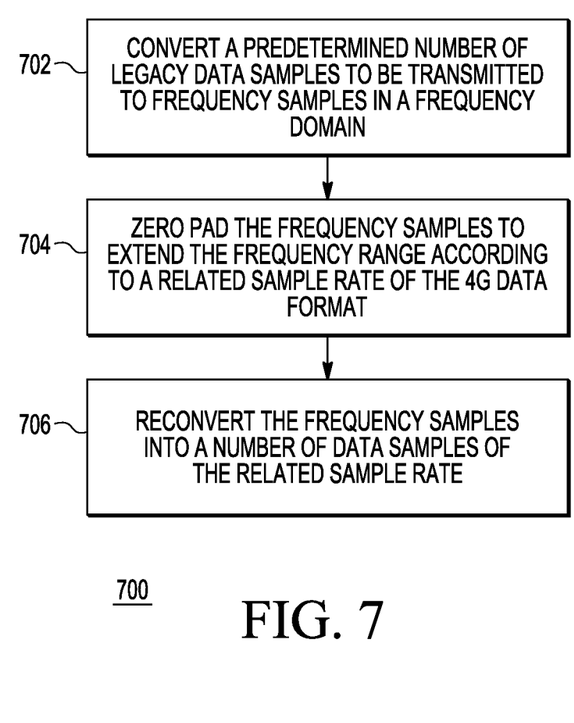
FIG. 7 shows a flowchart of a method for interfacing a radio unit in a mobile communication system.

FIG. 7 shows a flowchart of a method 700 for interfacing a radio unit in a mobile communication system. Method 700 begins at step 702. At step 702, convert a predetermined number of legacy data samples to be transmitted to frequency samples in a frequency domain. At step 704, zero pad the frequency samples to extend the frequency range according to a related sample rate of the 4G data format. At step 706, reconvert the frequency samples into a number of data samples of the related sample rate. The related sample rate is a multiplication of S/K times a basic frame rate of the 4G data format. Samples S are allocated to frames K, where K and S are integers and K is 8 or less.

The above interfacing conversion procedure may be implemented in any radio device that needs to communicate to a controller in a base station. The device is arranged to perform the method according to any of the above described embodiments. For example, the device is a control unit in a base station (such as BS1 in FIG. 1). Also, the device may be a semiconductor device for a communication device, in the form of an integrated circuit, such as a Field Programmable Gate Array (FPGA), a microcontroller including peripherals circuits, a digital signal processor (DSP), or a suitably programmed general purpose processor (GPP). Also, the device may be a receiver comprising such a programmable processor, the programmable processor being arranged to execute a program code comprising instructions for causing the programmable processor to perform the method. Also, the receiver may comprise a semiconductor circuitry, the semiconductor circuitry being specially designed to execute the above method.

Optionally, the program code may be provided on a computer readable medium, also called a medium comprising a computer program product, the computer program product comprising instructions for causing a processor apparatus to perform the above interfacing method. The computer program product may further comprise instructions for causing a processor apparatus to perform other processing stages of the receive chain, such as frequency domain processing. The computer program product may be embodied on a computer readable medium as physical marks or by means of magnetization of the computer readable medium, e.g. an optical disc, a hard disk, solid state memory, flash memory, etc., and may be non-recordable or recordable.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of interfacing a radio unit and a radio controller unit in a base station in a mobile communication system, one of the units having a common public radio interface according to a first version of a common public radio interface standard, and the other unit having a common public radio interface according to a second version of a common public radio interface standard, both the first and second version supporting a 4G data format for transferring data samples for communicating via a fourth generation system for mobile communication, the second version further providing a data format for transferring legacy data samples for communicating via a legacy system for mobile communication of a generation before the fourth generation, which data format is not provided by the first version, the method comprising:
converting a predetermined number of the legacy data samples to be transmitted to frequency samples in a frequency domain;
zero padding the frequency samples to extend the frequency range according to a related sample rate of the 4G data format; and
reconverting the frequency samples into a number of data samples of the related sample rate, wherein
the related sample rate is a multiplication of S/K times a basic frame rate of the 4G data format,
S samples are allocated to K frames, and
K and S being integers and K being 8 or less.

2. The method of claim 1, wherein S is 1 and K is 4.

3. The method of claim 1, wherein the legacy sample rate is 325 kHz and the related sample rate is 960 kHz or 1920 kHz.

4. The method of claim 3, wherein the predetermined number of the legacy data samples is 65 and the number of samples of the related data rate is 192.

5. The method of claim 1, wherein the legacy sample rate is 270.8 kHz and the related sample rate is 960 kHz or 1920 kHz.

6. The method of claim 5, wherein the predetermined number of the legacy data samples is 325 and the number of samples of the related data rate is 1152.

7. The method of claim 1, wherein the conversion process comprises
converting a predetermined number of received data samples having the related sample rate to frequency samples in a frequency domain,
selecting the first R frequency samples to limit the frequency range according to the legacy sample rate and
reconverting the selected frequency samples into data samples having the legacy sample rate, wherein R corresponds to said predetermined number of the legacy data samples to be transmitted.

8. The method of any of the above claims, wherein the conversion process comprises number-converting first samples to be transmitted having first modulation components represented by a predetermined number of bits according to the first version of the common public radio interface standard by converting the first modulation components to second modulation components having an exponent, mantissa representation according to the second version.

9. The method of claim 1, wherein the conversion process comprises number-converting received data samples having second modulation components having an exponent, mantissa representation according to the second version of the common public radio interface standard, by converting the second modulation components to first modulation components represented by a predetermined number of bits according to the first version.

10. The method of claim 1, wherein the basic frame rate of the 4G data format is 3.84 Mega frames per second.

11. A base station for a mobile communication system, the base station comprising:
a radio unit;
a radio controller unit, wherein
one of the radio unit or the radio controller unit has a common public radio interface according to a first version of a common public radio interface standard and the other of the units has a common public radio interface according to a second version of a common public radio interface standard, both the first and second versions of the common public radio interface standard configured to support a 4G data format for transferring data samples for communicating via a fourth generation system for mobile communication, and the second version is further configured to provide a data format for transferring legacy data samples for communicating via a legacy system for mobile communication of a generation before the fourth generation, which data format is not provided by the first version;
an interface device, configured to interface between the radio unit and the radio controller unit, and comprising a processor configured to rate-convert the legacy data samples having a legacy sample rate as predefined in the legacy system by being further configured to
convert a predetermined number of the legacy data samples to be transmitted to frequency samples in a frequency domain,
zero pad the frequency samples to extend the frequency range according to a related sample rate of the 4G data format and
reconvert the frequency samples into a number of data samples of the related sample rate, wherein
the related sample rate is a multiplication of S/K times a basic frame rate of the 4G data format, S samples being allocated to K frames, K and S being integers and K being 8 or less.

12. The base station of claim 11, wherein S is 1 and K is 4.

13. The base station of claim 11, wherein the legacy sample rate is 325 kHz and the related sample rate is 960 kHz or 1920 kHz, or the legacy sample rate is 270.8 kHz and the related sample rate is 960 kHz or 1920 kHz.

14. The base station of claim 11, wherein the interface device is configured to perform the rate-converting by
converting a predetermined number of received data samples having the related sample rate to frequency samples in a frequency domain,
selecting the first R frequency samples to limit the frequency range according to the legacy sample rate and
reconverting the selected frequency samples into data samples having the legacy sample rate, wherein R corresponds to said predetermined number of the legacy data samples to be transmitted.

15. The base station of claim 11, wherein the interface device is configured to perform the conversion process by virtue of being configured to number-convert first samples to be transmitted having first modulation components represented by a predetermined number of bits according to the first version of the common public radio interface standard by converting the first modulation components to second modulation components having an exponent, mantissa representation according to the second version.

16. The base station of claim 11, wherein the interface device is configured to perform the conversion process by virtue of being configured to number-convert received data samples having second modulation components having an exponent, mantissa representation according to the second version of the common public radio interface standard, by converting the second modulation components to first modulation components represented by a predetermined number of bits according to the first version.

* * * * *